June 12, 1956     O. J. McCULLOUGH     2,750,583
RADIOACTIVE GUIDING SYSTEM FOR MOBILE VEHICLES
Filed Jan. 26, 1953     3 Sheets-Sheet 1
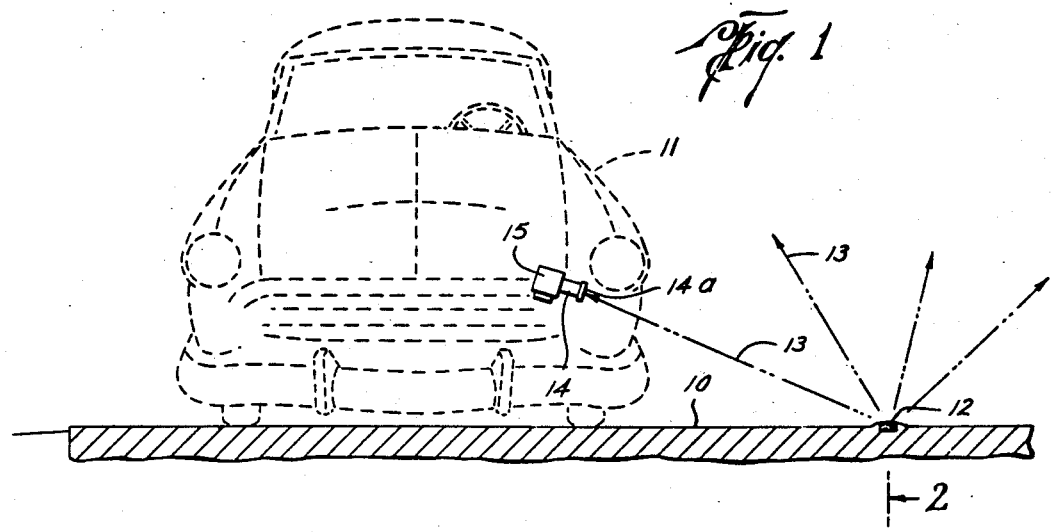
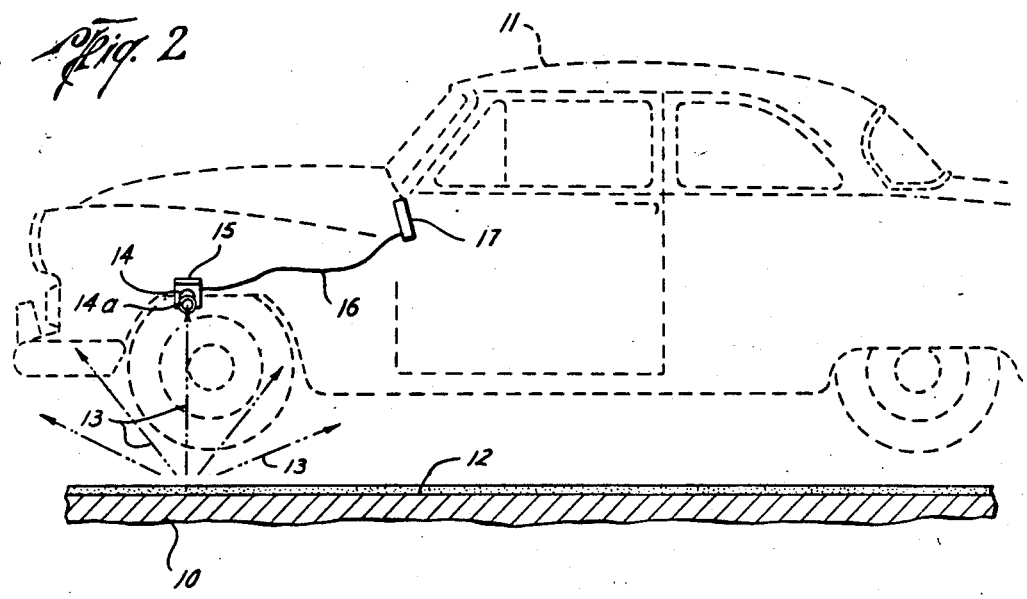
Otis J. McCullough
INVENTOR.
BY
ATTORNEY June 12, 1956   O. J. McCULLOUGH   2,750,583
RADIOACTIVE GUIDING SYSTEM FOR MOBILE VEHICLES
Filed Jan. 26, 1953   3 Sheets-Sheet 2

Otis J. McCullough
INVENTOR.

BY

ATTORNEY

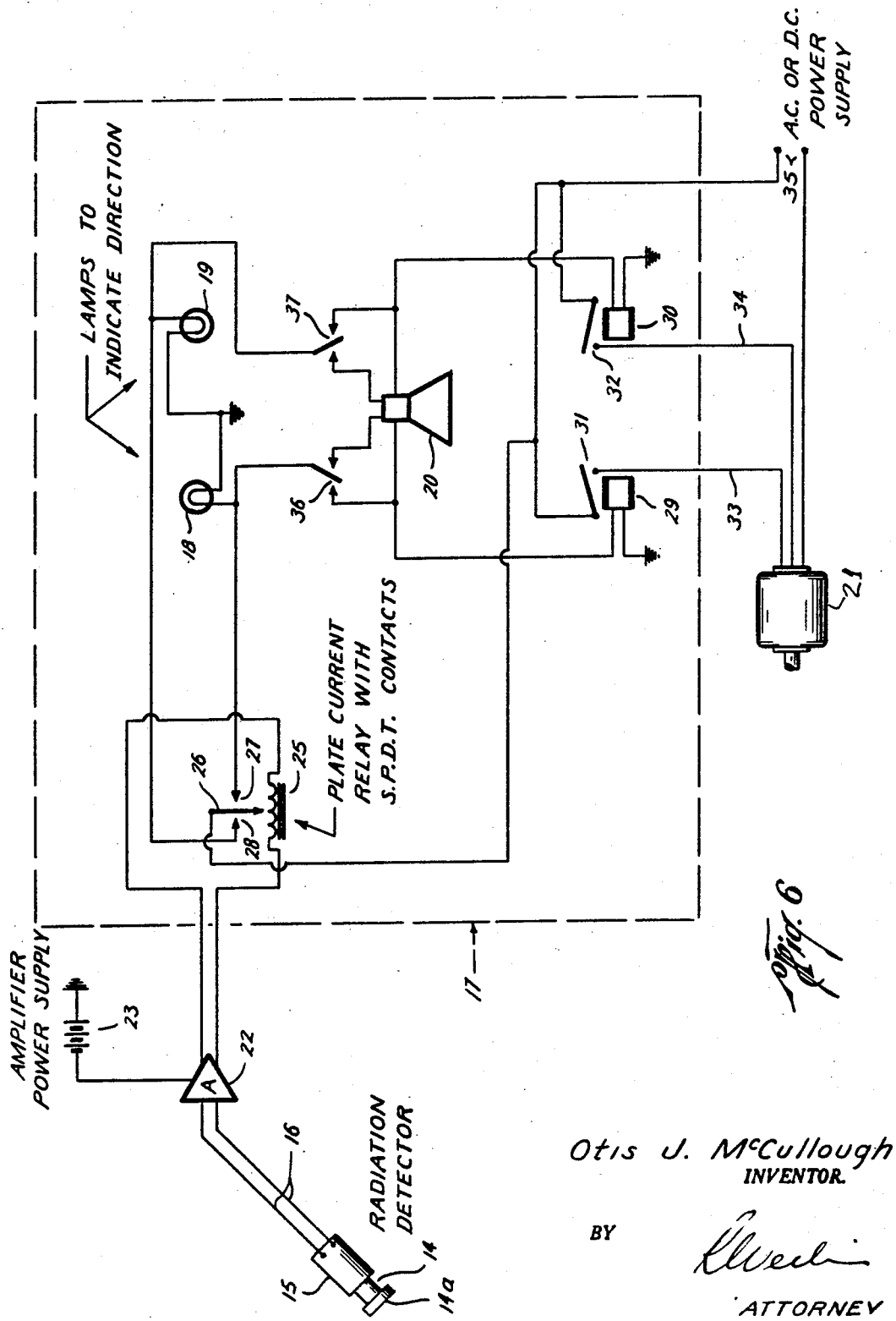

United States Patent Office 2,750,583
Patented June 12, 1956

2,750,583

RADIOACTIVE GUIDING SYSTEM FOR MOBILE VEHICLES

Otis J. McCullough, Houston, Tex.

Application January 26, 1953, Serial No. 333,065

11 Claims. (Cl. 340—282)

This invention relates to radioactive guiding devices for mobile vehicles travelling on the earth's surface. The invention has particular reference to the guiding of vehicles such as motor vehicles, airplanes and the like which, when travelling on the ground, are ordinarily manually guided or steered along a desired path of travel by a human operator. Such vehicles may, for purposes of this description, be termed "free-steering" to distinguish them from other mobile vehicles such as trains or rail cars for which the rails on which they run provide a fixed path of travel rendering their steering independent of the actions of their operators.

Streets and highways are ordinarily provided with center or lane stripes or other visible markers to guide an operator in steering vehicles along such streets or highways. Proper guidance of the vehicle depends on continued visual observation of such markers by the vehicle operator to keep the vehicle moving in proper relation to the markers. Operators of vehicles such as automobiles, trucks, and the like, are all too familiar with the often disastrous results of failure to maintain continuous observation of the guide stripes or other markers. Momentary distractions of the operator's attention from the guide markers, as by temporary blindness caused by opposing lights, falling asleep at the wheel, or for other reasons, may cause the vehicle to wander from a proper and safe path into an oppositely moving line of traffic or into ditches, culverts, bridge rails or other dangerous hazards which may be present along the path of travel.

The difficulties of maintaining a vehicle in proper relation to conventional guide stripes or markers are, as is well known, greatly intensified under conditions of darkness, as when driving at night, or in heavy fogs, or during rainstorms and the like.

The primary object of the present invention, therefore, is to provide an improved guide means which will furnish a continuous indication of the position of a free-steering vehicle relative to a guide path, without requiring visual observation of a guide line or marker by the operator to steer the vehicle on a desired path of travel.

Briefly stated, this invention contemplates the employment of a guide line or marker for the desired path of travel which is defined by radioactive material, and a radiation detector mounted on a vehicle and responsive to the radiations received from the radioactive guide line or marker to provide a continuous indication of the position of the vehicle relative to the guide line.

In accordance with this invention, a guide line for the path to be travelled by a vehicle is defined by means of a radioactive material producing emanations which are normally invisible to the eye. A generally conventional type of radiation detector capable of quantitatively measuring the intensity of the emanations from such material is mounted on the vehicle and directed toward the guide line. It is found that the quantity of radiation received by the detector will vary in a generally linear relation to the distance between the radioactive source and the detector, the quantity of received radiation varying inversely as the distance between the detector and the source in the guide line. The quantity of radiation received by the detector may be employed in a well known manner to generate an appropriate electric impulse or signal which may, in turn, be employed to actuate a visual or audible signalling device, or to automatically control the steering mechanism of the vehicle in order to maintain the vehicle in a fixed or pre-determined relation to the guide line.

By means of the present invention, a vehicle may be effectively and safely guided along a pre-determined path of travel under conditions of complete darkness, in which ordinary guide markers would be completely invisible to an operator.

The invention has numerous applications and particularly many military applications. For example, under battle conditions it is often necessary to move vehicles carrying men and supplies over areas exposed to enemy fire. The safest time for such movements will ordinarily be at night under cover of darkness. However, heretofore, the hazards attending such movements have been very great and required the use of headlights which, even though greatly dimmed, would nevertheless be observed by an enemy.

With the present invention, a guide line of radioactive material could first be laid down on the ground to define a path to be followed by such vehicles and the vehicles could then be directed along such a path in total darkness, without the use of any lights, merely by following the indications provided by the radiation detector. Similar guidance would be provided under conditions of heavy fog.

Airplane runways could be marked in a similar manner which would enable airplanes to take off from a completely darkened field and thereby avoid the need for the more conventional illuminated runway markers or other visible guide means which might otherwise attract the attention of an enemy.

Many other objects and advantages of this invention will become more readily apparent from the following detailed description when read in conjunction with the accompanying drawing which illustrates several useful embodiments in accordance with this invention.

In the drawing:

Fig. 1 is a generally schematic elevational view of the front end of a motor vehicle travelling along a roadway showing one arrangement for mounting a radiation detector relative to a radioactive guide line;

Fig. 2 is a side elevational view of the arrangement shown in Fig. 1, as seen generally along line 2—2 of Fig. 1;

Fig. 6 is a diagram of the electrical circuits connecting the detector to the indicator devices and steering control motor.

Figure 3:
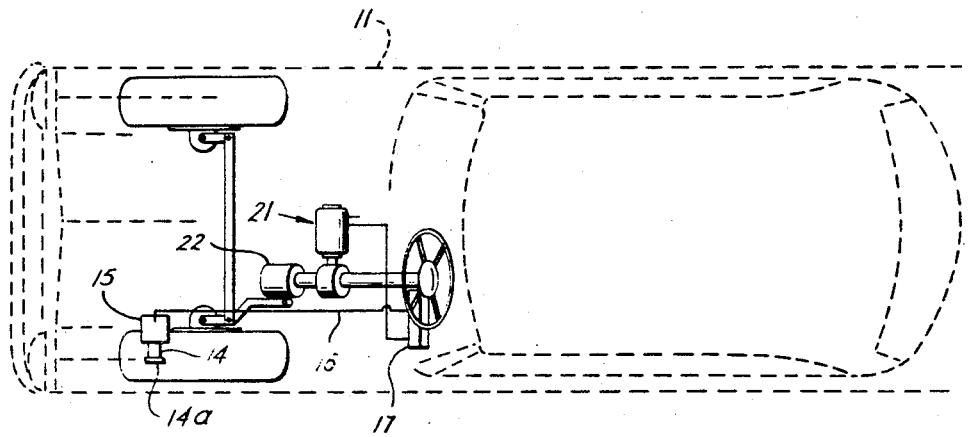
Fig. 3 is a generally schematic top plan view showing a radiation detector connected to the steering apparatus of a motor vehicle.

Referring to Figs. 1 and 2, there is shown a section of a roadway 10 along which a vehicle 11, such as an automobile, is travelling. A marker or guide line 12 is suitably disposed on the roadway to define its longitudinal center line or some other lane or segment of the roadway extending generally parallel to the desired path of travel of the vehicle and to one side thereof.

Guide line 12 is composed of any suitable radioactive material providing a source of emanations indicated by the broken lines 13 which, while normally invisible, will activate a radiation detector 14 fixedly mounted on vehicle 11 and directed at an angle toward the radiation source. Detector 14 may be any generally well known radiation detector device adapted to provide a quantitative measurement of the received radiation, such as a Geiger-Muller counter, ionization chamber, scintillation counter or the like, and will be appropriately connected to suitable electronic apparatus 15 of well known character adapted to convert the quantitative measurements of the detector into electronic impulses or signals of corresponding value or magnitude and to transmit the signals, as through a cable 16, to suitable indicating or recording devices, such as a panel 17 which may be mounted on the dashboard or in some other appropriate location on the vehicle. The panel may include signal lights 18 and 19, incorporated in an appropriate circuit with the detector, to be actuated by the received signal to provide visual indications of the position of the vehicle relative to the guide line. The panel circuit may include a buzzer or bell, indicated at 20, by which an audible signal may be provided to indicate when the departure of the vehicle from the guide line exceeds a predetermined safe distance. Lights 18 and 19 may be of different colors and of the well known flashing variety, which may indicate excessive departures of the vehicle, respectively, toward or away from the guide line. It will be understood that numerous other known signalling arrangements may be employed for actuation by the radiation detector to provide suitable visual or audible indications of the position of the vehicle relative to the guide line.

The radioactive material defining guide line 12 may be naturally occurring radioactive materials or suitable radioisotopes now available in relatively large quantities and at comparatively low cost as products of atomic piles. The various emanations of such materials which may be employed for the purposes of this invention may be gamma rays, neutrons, alpha or beta particles. Detector 14 will be of one of the well known types adapted to most effectively count or measure the desired emanations.

The radioactive material may be incorporated in a paint or other coating material which adheres to the surface travelled by the vehicle, or may be otherwise suitably embedded in or attached to such surface. If the guide line is to be temporary in nature, the radioactive material may be one having a relative short radioactive life. In general, it will be one which will endure for whatever length of time the guide marker is to be used for guidance purposes.

The radiation detector 14 has a fixed area, indicated at 14a, which will be exposed to the emanations from the radioactive material. The emanations normally discharge from the radioactive materials in radially diverging paths extending in all directions from the source as a focus. Under these circumstances it is found that the intensity or amount of radiation received by the detector through fixed area portion 14a will vary inversely with the distance between the source and the detector. Since the detector is mounted in fixed position on the vehicle, the closer the vehicle approaches the guide line the more radiation will be received by the detector, and the farther the vehicle departs from the guide line the less will be the radiation received. The detector and its associated electronic apparatus will thus provide a continuous indication of the variations in position of the vehicle relative to the guide line and the signals produced thereby may be employed by the operator to guide the vehicle in a predetermined positional relationship to the guide line.

The guide line may be continuous or may be interrupted by unmarked intervals which will normally be relatively short particularly if the vehicle is to be driven at relatively high speeds along the defined path. The portions of the detector, other than that to be exposed to the radiations, may be shielded from extraneous or random radiation by any suitable shielding means, such as lead, which is commonly used for such shielding.

The radioactive material will preferably be one whose emanations can travel substantial distances before being absorbed by air or moisture such as would exist in the space intervening between the source and the detector. Sources having relatively high gamma ray counts will ordinarily be preferred but sources having relatively high counts of other types of emanations may also be used with appropriate detectors for such emanations. The quantities of radioactive material required for effective guidance purposes will ordinarily be quite small so that there will be very little danger of creating hazard to humans or lower animals subjected to the emanations therefrom.

Fig. 3 illustrates an arrangement whereby the signal from the detector may be impressed on a suitable and generally conventional servo-mechanism, indicated generally by the numeral 21, which may be connected to the steering mechanism 22 of the vehicle to automatically control the steering of the vehicle in accordance with the detector signal to thereby continuously guide the vehicle along a travel path at a fixed distance from the guide line.

Figure 4:
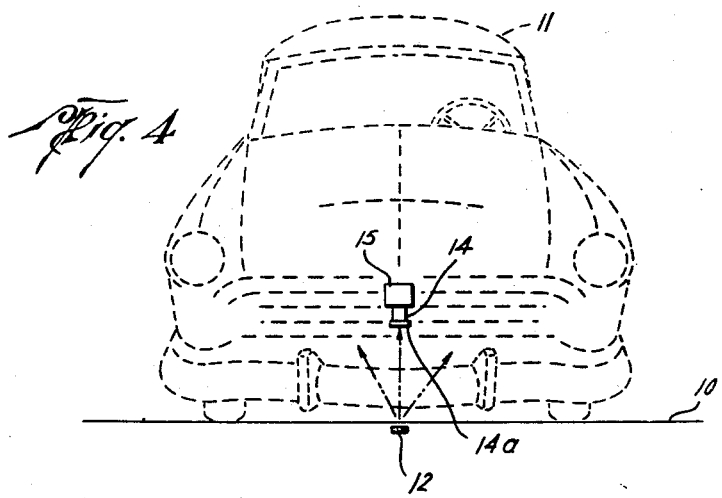
Fig. 4 is a view similar to Fig. 1 showing a modified relative arrangement of the radiation source and the detector.
Figure 5:
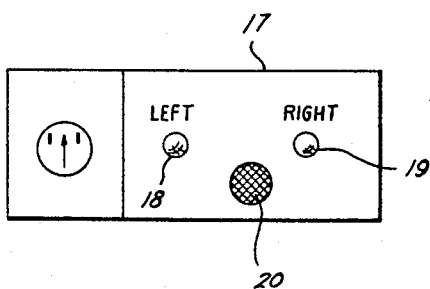
Fig. 5 is a view of a form of indicator panel for displaying signals obtained from the radiation detector.

Fig. 4 illustrates a modification of apparatus in which the detector 14 is directed vertically downwardly toward guide line 12 which is aligned with the longitudinal axis of the vehicle. With this arrangement, any digressions of the vehicle to either side of the path defined by guide line 12 will produce a corresponding variation in the amount of radiation received by the detector and the resulting signal may be employed in the manner previously described to correct the direction of movement of the vehicle.

Fig. 6 illustrates diagrammatically a conventional electrical circuit which may be installed, for example in panel 17, for operatively connecting the radiation detector to the several visual and audible indicating devices and to the motor controlling the steering mechanism of the vehicle.

As schematically shown, the output from the radiation detector is suitably amplified by means of an amplifier 22 provided with a power supply 23. The ouput from amplifier 22 is fed through a plate current relay 25 operating a switch of the single pole, double throw type including the moving contact 26 movable between the stationary contacts 27, 28. The latter are connected in parallel circuits which respectively include lamps 18 and 19 and the relays 29 and 30, respectively, having relay contacts 31 and 32, adapted to close circuits to the respective motor leads 33 and 34, depending upon which of the relays is actuated. Motor leads 33 and 34 are connected to steering motor 21. Relay contacts 31 and 32 are in circuit with a power source, indicated by the terminals 35, and are also in circuit with moving contact 26 of relay 25. An audio signalling device 20 is shown parallel connected by means of manually operated switches 36 and 37 into each of the circuits between lamps 18 and 19 and relays 29 and 30.

By means of this circuit a signal, either visual or audible, may be supplied to indicate the direction of deviation of the vehicle from the guide line, and, by means of relays 29 and 30, to steer the vehicle in accordance with the signal indication.

It will be evident that many other arrangements of apparatus and modifications of the details thereof may be made in accordance with this invention within the scope of the appended claims but without departing from the spirit of the invention.

What I claim and desire to secure by Letters Patent is:

1. A radioactive guide system for mobile vehicles, comprising, the combination with a radioactive guide line defining a travel path on a surface traversed by a vehicle, of a radiation detector means positioned on the vehicle and responsive to radiations from said guide line to thereby continuously indicate the position of said vehicle relative to said guide line.

2. A radioactive guide system for mobile vehicles, comprising, the combination with a radioactive guide line defining a travel path on a surface traversed by a vehicle, of a radiation detector means positioned on the vehicle and having a fixed area exposed to radiations from said guide line, said detector means being quantitatively responsive to the amount of radiation received from said guide line to thereby continuously indicate the position of said vehicle relative to said guide line.

3. A radioactive guide system for mobile vehicles, comprising, the combination with a radioactive guide line defining a travel path on a surface traversed by a vehicle, of a radiation detector means positioned on said vehicle to receive radiation from said guide line in amounts varying in proportion to the position of the vehicle relative to the guide line, and means connected to said detector and responsive to the radiation received thereby to thereby provide an indication of the position of said vehicle relative to said guide line.

4. A radioactive guide system for mobile vehicles, comprising, the combination with a radioactive guide line defining a travel path on a surface traversed by a vehicle, of a radiation counter positioned on the vehicle and having a radiation-receiving portion of fixed area directed toward said guide line, and means responsive to the quantities of radiation received by said detector through said portion to thereby provide an indication of the position of said vehicle relative to said guide line.

5. A radioactive guide system for mobile vehicles, comprising, the combination with a radioactive guide line defining a travel path on a surface traversed by a vehicle, of a radiation detector means positioned on said vehicle to move therewith relative to said guide line, said radiation detector being constructed and arranged to receive radiation from said guide line in amounts varying in proportion to the variations in the position of said vehicle relative to said guide line, and signal means connected to said detector and responsive to the variations in the amount of radiation received by said detector to thereby provide a signal indicative of the variations in the position of said vehicle relative to said guide lines.

6. A radioactive guide system as defined in claim 5 wherein said signal provided by said signal means is a signal of visible character.

7. A radioactive guide system as defined in claim 5 wherein said signal provided by said signal means is a signal of audible character.

8. A radioactive guide system for mobile vehicles, comprising, the combination with a mobile vehicle having a steering apparatus, of a radioactive guide line defining a travel path on a surface traversed by said vehicle, of a radiation detector means positioned on said vehicle to move therewith relative to said guide line, said radiation detector being constructed and arranged to receive radiations from said guide line in amounts varying in proportion to the variations in the position of said vehicle relative to said guide line, of a servo-mechanism controlling said steering apparatus, and means connecting said detector to said servo-mechanism for actuating said servo-mechanism in accordance with the variations in indication received by the detector from said guide line.

9. In a guide system for mobile vehicles, a body of a radioactive material disposed in an extended line along a surface traversed by a vehicle to define thereon a travel path for said vehicle, a radioactivity detection means positioned on the vehicle and responsive to radioactive emanations from said material to thereby continuously indicate the position of the vehicle relative to said line.

10. A guide system according to claim 9 wherein said radioactive material has a pre-determined life period corresponding to the desired effective life of the system.

11. A guide system according to claim 9 wherein said radioactive material is incorporated in a paint material which is applied to said surface.

References Cited in the file of this patent

UNITED STATES PATENTS

| | | |
|---|---|---|
| 2,074,251 | Braun | Mar. 16, 1937 |
| 2,331,144 | Sitter | Oct. 5, 1943 |
| 2,339,291 | Paulus et al. | Jan. 18, 1944 |
| 2,690,626 | Gay et al. | Oct. 5, 1954 |